Sept. 20, 1966  R. B. COOPER  3,273,539
FEEDING SYSTEM
Filed March 27, 1964  2 Sheets-Sheet 1

ROBERT B. COOPER
INVENTOR

Huebner & Worrel
ATTORNEYS

ROBERT B. COOPER
INVENTOR

Huebner & Worrel
ATTORNEYS

United States Patent Office 3,273,539
Patented Sept. 20, 1966

3,273,539
FEEDING SYSTEM
Robert B. Cooper, 4832 N. Fruit, Fresno, Calif.
Filed Mar. 27, 1964, Ser. No. 355,173
13 Claims. (Cl. 119—52)

The present invention relates to a feeding system for poultry and the like and more particularly to such a feeding system providing a traveling feed hopper adapted to distribute feed in measured amounts along a predetermined path. While the present invention is shown and described in connection with the feeding of chickens, it will be apparent that the invention has equal utility for feeding a wide variety of other trough-fed animals.

The hand feeding of animals, particularly poultry, has long been the optimum or preferred method so as to insure desired even distribution of feed to all the animals. The feeding of large numbers of chickens in commercial chicken raising and egg producing operations precludes such hand feeding because of the time, labor, and expense involved. Although some mechanical feeders have been employed in an effort to simulate hand feeding, none have been sufficiently successful to be universally accepted. In such commercial installations, the chickens are usually confined in elongated rows of cages having an elongated feed trough mounted thereon which is accessible to chickens within the cages. Typical installations of this kind involve the feeding of thousands of chickens at predetermined intervals which makes hand feeding impractical. Conveyors have been used within the feeding troughs to distribute feed therein adjacent to all the cages along the trough but also have not been capable of providing an equal amount of the same grade of feed to all portions of the system. Since the chickens are selective in their feeding habits, the chickens at the inlet portion of the conveyor pick out the larger or higher grade feed, leaving only residue feed for the chickens at the far end of the conveyor.

Therefore, it is a broad object of the present invention to provide an improved feeding system for poultry and other animal life.

Another object is to provide such a feeding system which insures that the animals throughout the system receive equal amounts of the same grade of feed.

Another object is to provide an animal feeding system of the character described which is capable of reconditioning feed remaining in the troughs concurrently with the discharge of fresh feed therein.

Another object is to provide an animal feeding system for chickens and the like having a traveling hopper capable of distributing fresh feed evenly along the full length of the feed trough.

Another object is to provide such a traveling hopper in an animal feeding system which is capable of automatically alternately discharging feed into a plurality of feed troughs.

Another object is to provide such a traveling hopper in an animal feeding system capable of reversible movement along the troughs selectively to discharge feed individually into the troughs during said reversible movement.

Other objects and advantages of the present invention will subsequently become more clearly apparent upon reference to the following description in the specification.

Figure 1:
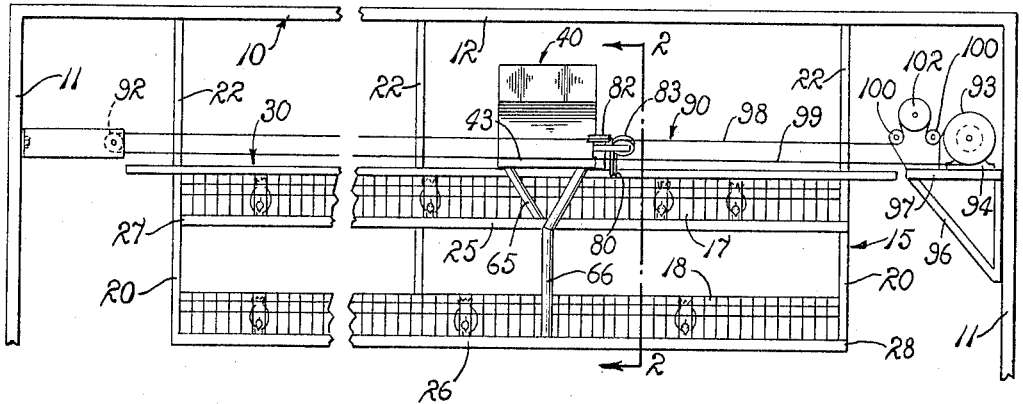
FIG. 1 is a side elevation of the animal feeding system of the present invention providing a traveling feed hopper adjacent to rows of animal cages.

Referring more particularly to the drawings, the animal feeding system of the present invention provides an elongated frame 10 having ground engaging end posts 11 supporting parallel top rails 12. Animal cages for chickens and the like are generally indicated at 15. The cages are separated into elongated elevationally spaced substantially parallel upper and lower rows 17 and 18, respectively, having opposite ends 20 which are dependently supported from the top rails 12 of the frame by a plurality of hanger bars 22.

Elongated upper and lower troughs 25 and 26 are individually mounted on the corresponding upper and lower rows 17 and 18 of the cages 15 in spaced substantially parallel relation and in position to be accessible to chickens within the cages. The upper and lower troughs provide opposite ends 27 and 28, respectively, adjacent to the opposite ends 20 of their respective rows of cages. A hopper support guide track 30 is disposed in spaced substantially parallel relation to the troughs and provides transversely opposite parallel side rails 32 and 33 of elongated angle iron material. The side rail 32 is mounted on the top of the upper row of cages 17 and the opposite side rail 33 is mounted on a flange portion 35 of one of the hanger bars 22 which may also support an adjacent row of cages, not shown.

An elongated feed hopper 40 having an upper feed storage portion 42 and a lower carriage portion 43 is mounted on the guide track 30 for reversible longitudinal movement along the troughs 25 and 26. The carriage portion of the hopper mounts a plurality of peripherally grooved rollers 45 which rollably engage the side rails 32 and 33 of the guide track. The upper feed storage portion of the hopper provides substantially upright outer end walls 47 interconnected by downwardly converging opposite side walls 48 all of which are connected to a bottom wall 49 and cooperatively define a feed compartment 50. A pair of opposite inner walls 52 are disposed within the compartment 50 and are connected to the outer end walls 47 and extend downwardly in inwardly declining relation and in converging relation to each other for connection to the bottom wall 49. An opening 53 is formed through the inner end walls 52 adjacent to the bottom wall to accommodate the extension of an elongated screw conveyor 55 therethrough having opposite forward and rearward ends 56 and 57 respectively extended through the opposite outer end walls 47 of the hopper. The ends of the screw conveyor are journaled for rotation individually within bearing caps 59 mounted as by cap screws 60 on rigid mounting plates 62 secured as by welding or the like to the outer end walls 47 of the hopper.

Figure 3:
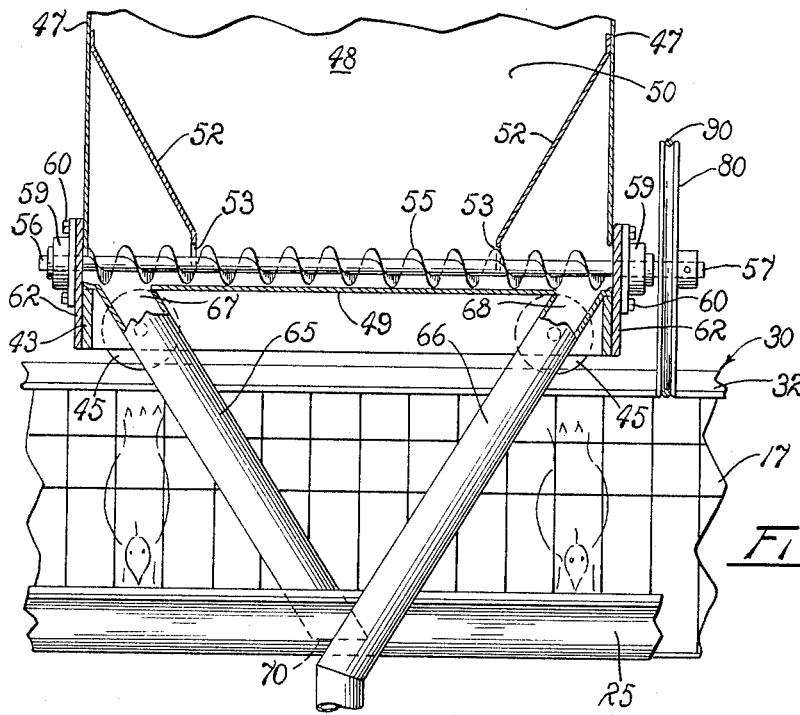
FIG. 3 is a longitudinal vertical section through the hopper taken on line 3—3 of FIG. 2 showing a feed screw conveyor disposed therein in side elevation.
Figure 4:
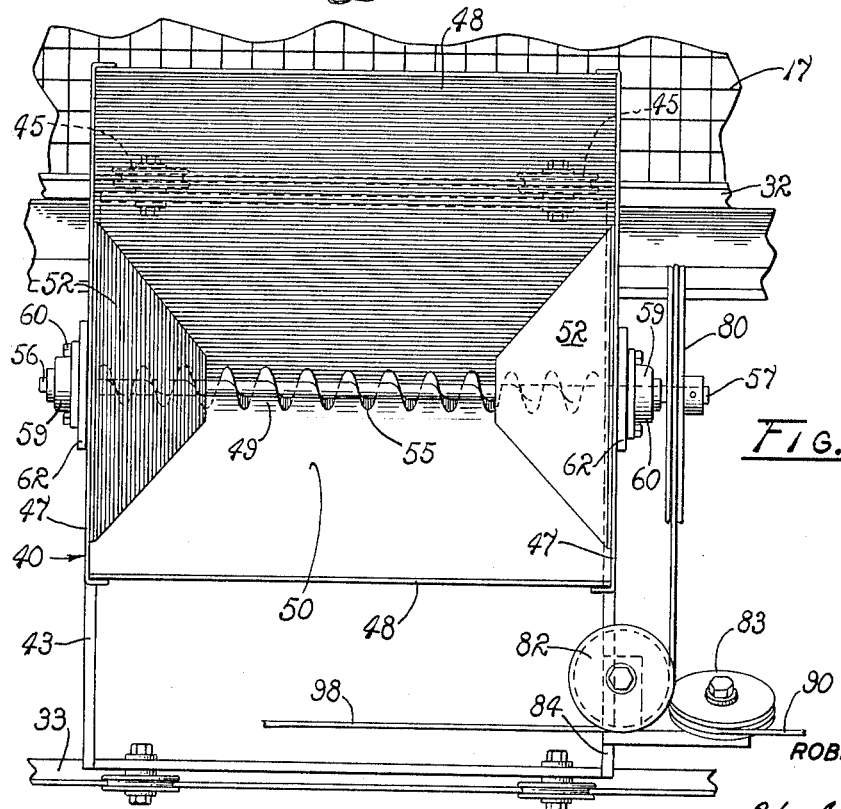
FIG. 4 is a top plan view of the conveyor and hopper drive mechanism.

Tubular feed discharge conduits 65 and 66 are extended from the ends of the hopper in depending relation from the bottom wall 49 of the hopper and in converging relation toward each other, as shown in FIG. 3. The conduits include upper ends 67 and 68, respectively, which are extended through openings in the bottom wall of the hopper in individual communication with the forward and rearward ends 56 and 57 of the screw conveyor. The discharge conduit 65 is considerably shorter than the conduit 66 and provides a lower open discharge end 70 extended into the upper trough 25. A flap 72 of substantially stiff sheet material is mounted on the open end 70 of the discharge conduit 65 in depending relation therefrom in closely spaced relation to the bottom of the trough. The feed discharge conduit 66 provides an open discharge end 74 extended into the lower trough 26 and mounts a flap 75 similar to the flap 72 of the discharge conduit 65.

A conveyor drive sheave 80 is mounted on the extended end 57 of the screw conveyor 55 for rotation in a plane disposed substantially normal to the plane of the troughs 25 and 26. A pair of directional change sheaves 82 and 83 are mounted on a bracket 84 upwardly extended from the carriage portion 43 in transversely spaced relation to the upper feed portion 42 of the hopper 40. The directional change sheaves are freely rotatable about their respective axes which are disposed in obtuse angular relation to each other with the sheaves presenting adjacent peripheral portions aligned with the plane of the conveyor drive sheave.

Figure 2:
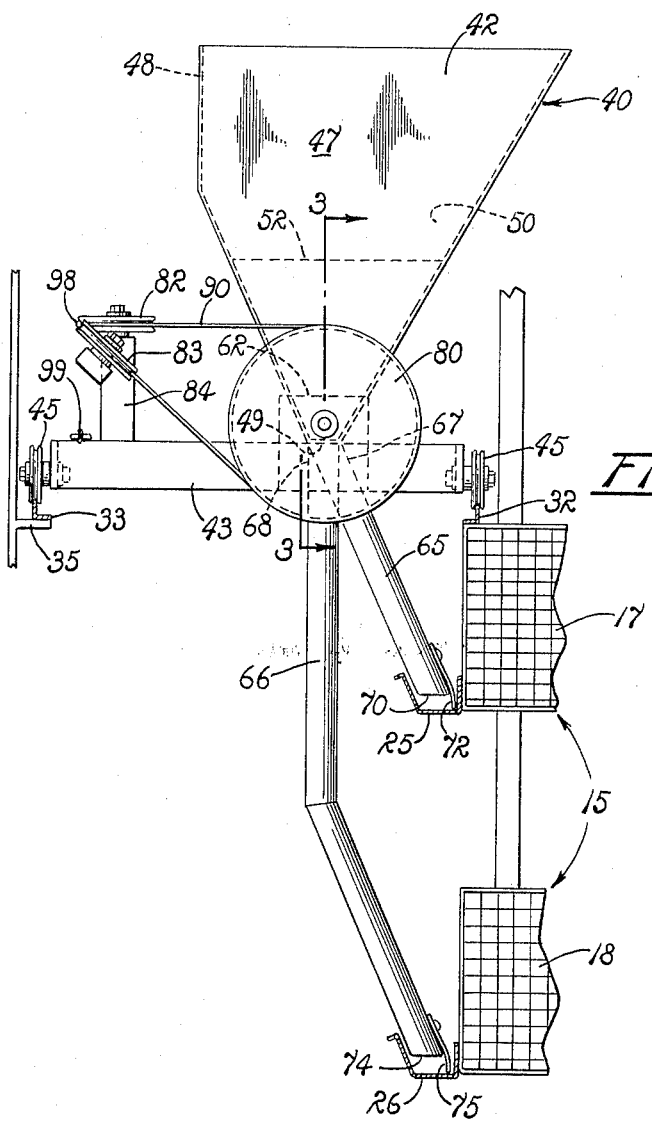
FIG. 2 is a transverse vertical section through the cages and feed troughs taken on line 2—2 of FIG. 1 showing the traveling hopper and drive mechanism thereof in end elevation.

The hopper is motivated for reversible movement between the ends of the troughs and cages by an endless drive cable 90. As best shown in FIG. 1, the drive cable is trained about a pulley 92 at one end of the troughs and a drive pulley 93 is mounted on a reversible motor 94 at the opposite ends of the troughs. The motor is supported in such position on an auxiliary frame 96 providing a shelf 97 to which the motor is secured, as by bolting or the like. The drive cable includes an upper run 98 and a lower run 99, the former of which is tensioned by an idler pulley 150. The idler pulley is mounted on a control mechanism 102 on the shelf 97 of the auxiliary frame to initiate movement of the hopper and automatically to reverse the motor or the opposite end of the troughs to return the hopper therefrom to its starting position. Such control mechanism is more adequately disclosed and described in my copending application entitled "Control Mechanism For A Traveling Member" concurrently filed herewith. The lower run 99 of the drive cable 90 is rigidly connected to the carriage portion 43 of the hopper 40. The upper run 98 of the drive cable is in a forward direction from left to right, as viewed in FIG. 1, first trained around the directional change sheave 82 for passage around the conveyor drive sheave 80 and, as best shown in FIG. 2, is returned upwardly over the directional change sheave 83 into the plane of the upper and lower runs of the cable.

OPERATION

The operation of the described embodiment of the subject invention is believed to be clearly apparent and is briefly summarized at this point. Before actuation, the hopper 40 is positioned at the right-hand end of the troughs and cages, as viewed in FIG. 1, adjacent to the drive motor 94. In such position, the feed compartment 50 thereof is filled with a predetermined quantity of feed in surrounding relation to the screw conveyor 55 adjacent to the bottom wall 49 of the hopper.

The control mechanism 102 is manually or automatically energized to start the feeding cycle by actuating the motor 94 to cause the lower run 99 of the drive cable 90 to travel from right to left, as viewed in FIG. 1, around the end pulley 92 to travel the upper run from left to right. With the lower run of the drive cable secured to the carriage, the hopper is traveled in a corresponding forward direction toward the opposite end of the troughs 25 and 26 and the cages 15. Such movement of the upper run causes the cable first to move past the directional change sheave 83 to the lower periphery of the conveyor drive sheave 80 and back to the directional change sheave 82 which rotates the conveyor drive sheave and screw 25 in a counterclockwise direction, as viewed in FIG. 2. Such rotation of the screw causes the threads thereof to carry feed from within the hopper toward the opening to the feed discharge conduit 65 for discharge therethrough into the upper trough 25. Varied pitch lead screws, not shown, can be provided if desired for varying the amount of feed discharged thereby so as to provide the optimum quantity of feed within the troughs.

After reaching the opposite end of the troughs, the hopper may be immediately returned or retained in that position by the desired setting of the control mechanism 102. When it is desired that the hopper return along the troughs, the control mechanism re-energizes the drive motor 94 in a reverse direction to cause the lower run of the drive cable to move from left to right, as viewed in FIG. 1, and the upper run thereof to be traveled from right to left. During such movement, the upper run travels about the directional change sheave 82 and downwardly around the conveyor drive sheave 80 to rotate the sheave and the screw conveyor 25 in a clockwise direction, as viewed in FIG. 2. Such reverse rotation causes the threads of the screw conveyor 25 to carry the feed through the opening 53 to the feed discharge conduit 66 for deposit in the lower feeding trough 26 in an amount identical to that discharged in said forward direction of movement.

Each of the flaps 72 and 75 are effective during discharge of the feed to maintain the feed outwardly from the rearward walls of their respective troughs in a position to be easily accessible to chickens in the cages 15. Also, the flaps are effective during subsequent feeding runs to stir or turn over any feed therein remaining from prior runs to prevent caking and spoilage of the feed.

In view of the foregoing, it is readily apparent that the structure of the present invention has provided an improved feeding system providing a traveling conveyor which insures an equal amount of the same grade feed to all portions of the system. The traveling hopper is mounted for reversible movement along a pair of troughs with the reversible screw conveyor therein being effective alternately to discharge feed into one trough during movement of the hopper in one direction and automatically to direct feed in to the other trough during movement of the hopper in the other direction. The screw conveyor is concurrently driven by the same drive cable which is utilized to motivate the hopper along the troughs by the directional change sheaves 82 and 83. It is also significant that the flaps 72 and 75 continually stir feed within the troughs to maintain such feed in optimum condition for consumption by the animals within the cages.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An animal feeding system comprising a feed hopper mounted for reversible movement along a predetermined path of travel and having a pair of spaced feed discharge members thereon providing elevationally spaced discharge ends for discharging feed in separate paths along said path of travel of the hopper, feed conveying means mounted in the hopper between said discharge members for directing feed from the hopper individually into said feed discharge members during said reversible movement of the hopper, and powered reversible drive means connected to said hopper and to said feed conveying means so that during movement of the hopper in one direction said feed conveying means directs feed from the hopper through one of said discharge members and during movement of the feed hopper in the other direction directs feed through the other discharge member.

2. An animal feeding system comprising a pair of substantially parallel feed troughs, a feed hopper having a pair of feed discharge members extended therefrom, means mounting said hopper adjacent to the troughs for reversible movement therealong with said discharge members individually extended toward the troughs to discharge feed therein, and feed conveying means mounted in the hopper for automatically alternately directing feed from the hopper through one discharge member into its respective trough during movement of the hopper in one direction and for directing feed from the hopper from the other discharge member into its respective trough during movement of the hopper in the other direction.

3. An animal feeding system comprising a pair of elevationally spaced substantially parallel feed troughs, a feed hopper having a pair of feed discharge members extended therefrom, means mounting said hopper adjacent to the troughs for reversible movement therealong with said discharge members individually extended toward the troughs to discharge feed therein, and feed conveying means mounted in the hopper for automatically alternately directing feed from the hopper through one discharge member into its respective trough during movement of the hopper in one direction and for directing feed from the hopper through the other discharge member into its respective trough during movement of the hopper in the other direction.

4. An animal feeding system comprising elongated upper and lower elevationally spaced substantially parallel feed troughs, an elongated feed hopper having upper and lower feed discharge members extended therefrom in longitudinally spaced relation, means mounting said hopper adjacent to the troughs for reversible movement longitudinally therealong with said upper and lower discharge members having open ends individually disposed adjacent to the corresponding upper and lower troughs, and feed conveying means mounted in the hopper for automatically alternately directing feed from the hopper through the upper discharge member into the upper trough during movement of the hopper in one direction and for directing feed from the hopper through the lower discharge member into the lower trough during movement of the hopper in the other direction.

5. An animal feeding system comprising elongated upper and lower elevationally spaced substantially parallel feed troughs, an elongated feed hopper having upper and lower feed discharge members extended therefrom in longitudinally spaced relation, means mounting said hopper adjacent to the troughs for reversible forward and return movement longitudinally therealong with said upper and lower discharge members having open ends individually extended into the corresponding upper and lower troughs, and feed conveying means mounted in the hopper for alternately directing feed from the hopper through the lower discharge member into the lower trough during forward movement of the hopper and for directing feed from the hopper through the upper discharge member into the upper trough during return movement of the hopper.

6. An animal feeding system comprising elongated upper and lower elevationally spaced substantially parallel feed troughs, an elongated feed hopper having upper and lower feed discharge members extended therefrom in longitudinally spaced relation, means mounting said hopper adjacent to the troughs for reversible forward and return movement longitudinally therealong with said upper and lower discharge members having open ends individually extended into the corresponding upper and lower troughs, feed conveying means mounted in the hopper for alternately directing feed from the hopper through the lower discharge member into the lower trough during forward movement of the hopper and for directing feed from the hopper through the upper discharge member into the upper trough during return movement of the hopper, and powered reversible drive means connected to said hopper and to said feed conveying means for motivating the hopper along the troughs in said forward and return directions and concurrently for driving said feed conveying means within the hopper.

7. An animal feeding system comprising elongated upper and lower elevationally spaced substantially parallel feed troughs having opposite ends, an elongated feed hopper having upper and lower feed discharge members extended therefrom in longitudinally spaced relation, means mounting said hopper adjacent to the troughs for reversible forward and return movement longitudinally therealong with said upper and lower discharge members having extended open ends individually disposed in feed discharging position adjacent to the corresponding upper and lower troughs, a feed conveyor mounted in the hopper having opposite ends disposed adjacent to said feed discharge members for alternately directing feed from the hopper through the lower discharge member into the lower trough during forward movement of the hopper and for directing feed from the hopper through the upper discharge member into the upper trough during return movement of the hopper, and endless drive means extended between said ends of the troughs for reversible movement therebetween having a portion drivingly connected to the hopper and an opposite portion drivingly engageable with said conveyor for motivating the hopper between said ends of the trough and for motivating said conveyor therein.

8. An animal feeding system comprising elongated upper and lower elevationally spaced substantially parallel feed troughs having opposite ends, an elongated feed hopper having upper and lower feed discharge members extended therefrom in longitudinally spaced relation, means mounting said hopper adjacent to the troughs for reversible forward and return movement longitudinally therealong with said upper and lower discharge members having extended open ends individually disposed in feed discharging position adjacent to the corresponding upper and lower troughs, a feed conveyor mounted in the hopper having opposite ends disposed adjacent to said feed discharge members for alternately directing feed from the hopper through the lower discharge member into the lower trough during forward movement of the hopper and for directing feed from the hopper through the upper discharge member into the upper trough during return movement of the hopper, an endless drive cable extended between said ends of the troughs for reversible movement therebetween having a lower run drivingly connected to the hopper, an opposite upper run drivingly engageable with said conveyor for motivating the hopper between said ends of the trough and for motivating said conveyor therein, and powered reversible drive means connected to said endless drive cable for motivating the same during said reversible movement.

9. An animal feeding system comprising elongated upper and lower elevationally spaced substantially parallel feed troughs having opposite ends, an elongated feed hopper having a pair of longitudinally spaced feed discharge members extended therefrom, means mounting said hopper adjacent to the troughs for reversible forward and return movement longitudinally therealong with said discharge members having elevationally spaced open discharge ends individually disposed in feed discharging position adjacent to the corresponding upper and lower troughs, a screw-threaded conveyor having opposite ends journaled in the hopper with said ends disposed adjacent to said feed discharge members for alternately directing feed from the hopper through the discharge member adjacent to the lower trough during forward movement of the hopper and for directing feed from the hopper through the discharge member adjacent to the upper trough during return movement of the hopper, a cable sheave mounted on one end of the screw conveyor, an endless drive cable extended between said ends of the troughs for reversible movement therebetween having a lower run drivingly connected to the hopper and an opposite upper run trained about said sheave for concurrently motivating the hopper in said reversing movement between said ends of the trough and for rotating the screw conveyor, and powered reversible drive means connected to said endless drive cable to motivate the same during said reversible movement.

10. An animal feeding system comprising elongated upper and lower elevationally spaced substantially parallel feed troughs having opposite ends, an elongated feed hopper having opposite ends and a pair of feed discharge members extended from said ends of the hopper, means mounting said hopper adjacent to the troughs for reversible forward and return movement longitudinally therealong with said discharge members having elevationally spaced open discharge ends individually disposed in feed discharging position adjacent to the corresponding upper and lower discharge members, a screw conveyor having opposite ends journaled in the ends of the hopper with said ends of the conveyor disposed adjacent to said feed discharge members for alternately directing feed from the hopper through the discharge member adjacent to the lower trough during forward movement of the hopper and for directing feed from the hopper through the discharge member adjacent to the upper trough during return movement of the hopper, a cable sheave mounted on one of the ends of the screw conveyor disposed in a plane substantially normal to the plane of the troughs, directional change means mounted on the hopper having portions aligned with said plane of the sheave, an endless drive cable extended between said ends of the troughs in a plane disposed in spaced substantially parallel relation to the troughs for reversible movement therebetween having a lower run drivingly connected to the hopper and an opposite upper run engageable with said directional change means and trained about said sheave for concurrently motivating the hopper in said reversing movement between said ends of the trough and for rotating the screw conveyor, and powered reversible drive means connected to said endless drive cable to motivate the same during said reversible movement.

11. An animal feeding system comprising a frame; at least a pair of rows of animal cages mounted on the frame in elevationally spaced substantially parallel relation; an elongated feed trough having opposite ends mounted on each of said cages in a position accessible to animals in the cages and disposed in spaced substantially parallel relation to each other; guide means mounted on the frame in parallel relation above the cages and troughs; an elongated feed hopper mounted on said guide means for reversible forward and return movement longitudinally along said cages and troughs, said hopper providing opposite ends and a pair of feed discharging conduits extended from said ends of the hopper with the conduits providing extended open discharge ends individually disposed within said troughs; a screw conveyor having opposite ends journaled in the ends of the hopper with said ends of the conveyor disposed adjacent to said feed discharge conduits for alternately directing feed from the hopper through said discharge conduits and into their respective troughs; a conveyor drive sheave mounted on one of the ends of the screw conveyor disposed in a plane substantially normal to the plane of the troughs; a pair of directional change sheaves mounted on the hopper having peripheral portions tangentially aligned with said plane of the conveyor drive sheave; a pair of drive pulleys individually mounted on the frame in spaced relation individually adjacent to the ends of the troughs; powered reversible drive means mounted on the frame having driving connection to one of said drive pulleys; and an endless drive cable trained about said drive pulleys and extended therebetween in a plane disposed in spaced substantially parallel relation to the troughs for reversible movement and having a lower run drivingly connected to the hopper and an opposite upper run trained about said conveyor drive sheave and said directional change sheaves for concurrently motivating the hopper in said reversing movement between said ends of the trough and for rotating the screw conveyor within the hopper so as to discharge feed into the lower trough during forward movement of the hopper and to discharge feed into the upper trough during return movement of the hopper.

12. An animal feeding system comprising a frame; at least a pair of rows of animal cages mounted on the frame in elevationally spaced substantially parallel relation; an elongated feed trough having opposite ends mounted on each of said cages in a position accessible to animals in the cages and disposed in spaced substantially parallel relation to each other; elongated tracks mounted on the frame in parallel relation above the cages and troughs; an elongated feed hopper having rollers mounted on said tracks for reversible forward and return movement longitudinally along said cages and troughs, said hopper providing opposite ends and a pair of feed discharging conduits extended from said ends of the hopper with the conduits providing extended open discharge ends individually disposed within said troughs; a screw conveyor having opposite ends journaled in the ends of the hopper with said ends of the conveyor disposed adjacent to said feed discharge conduits for alternately directing feed from the hopper through said discharge conduits and into their respective troughs; a conveyor drive sheave mounted on one of the ends of the screw conveyor disposed in a plane substantially normal to the plane of the troughs; a pair of directional change sheaves mounted on the hopper for rotation about axes disposed in obtuse angular relation and having peripheral portions tangentially aligned with said plane of the conveyor drive sheave; a pair of drive pulleys individually mounted on the frame in spaced relation individually adjacent to the ends of the troughs; powered reversible drive means mounted on the frame having driving connection to one of said drive pulleys; an endless drive cable trained about said drive pulleys and extended therebetween in a plane disposed in spaced substantially parallel relation to the troughs for reversible movement and having a lower run drivingly connected to the hopper and an opposite upper run trained about said conveyor drive sheave and said directional change sheaves for concurrently motivating the hopper in said reversing movement between said ends of the trough and for rotating the screw conveyor within the hopper so as to discharge feed into the lower trough during forward movement of the hopper and to discharge feed into the upper trough during return movement of the hopper; and a flap member of substantially stiff sheet material mounted on each of the feed discharge conduits and extended from the open discharge ends thereof into the troughs for turning deposited feed therein.

13. An animal feeding system adapted to discharge feed in spaced substantially parallel separate paths comprising an elongated feed hopper having opposite end walls and a bottom wall, a pair of feed discharge members extended in depending relation from the bottom wall individually adjacent to said ends thereof, means mounting said hopper adjacent to said feed paths for reversible movement therealong with said discharge members individually extended toward the feed paths to discharge feed therein, and an elongated rotary feed conveying member having opposite ends individually rotatably journaled in said end walls of the hopper closely adjacent to said bottom wall thereof for automatically alternately directing feed axially thereof between said end walls of the hopper for discharge from the hopper through one discharge member into its respective feed path during movement of the hopper in one direction and for directing feed from the hopper through the other discharge member into its respective feed path during movement of the hopper in the other direction.

References Cited by the Examiner

UNITED STATES PATENTS

| 2,369,316 | 2/1945 | Scott | 119—17 |
| 2,786,448 | 3/1957 | McMaster | 119—52 |
| 3,164,128 | 1/1965 | Arledge | 119—18 |

FOREIGN PATENTS 325,006   12/1902   France.

SAMUEL KOREN, Primary Examiner.

HUGH R. CHAMBLEE, Examiner.